Aug. 17, 1965   R. A. LEHMKUHL   3,200,492
MULTIPLE USE MACHINE WITH TOOL CHANGER
Filed Aug. 27, 1962   9 Sheets-Sheet 1
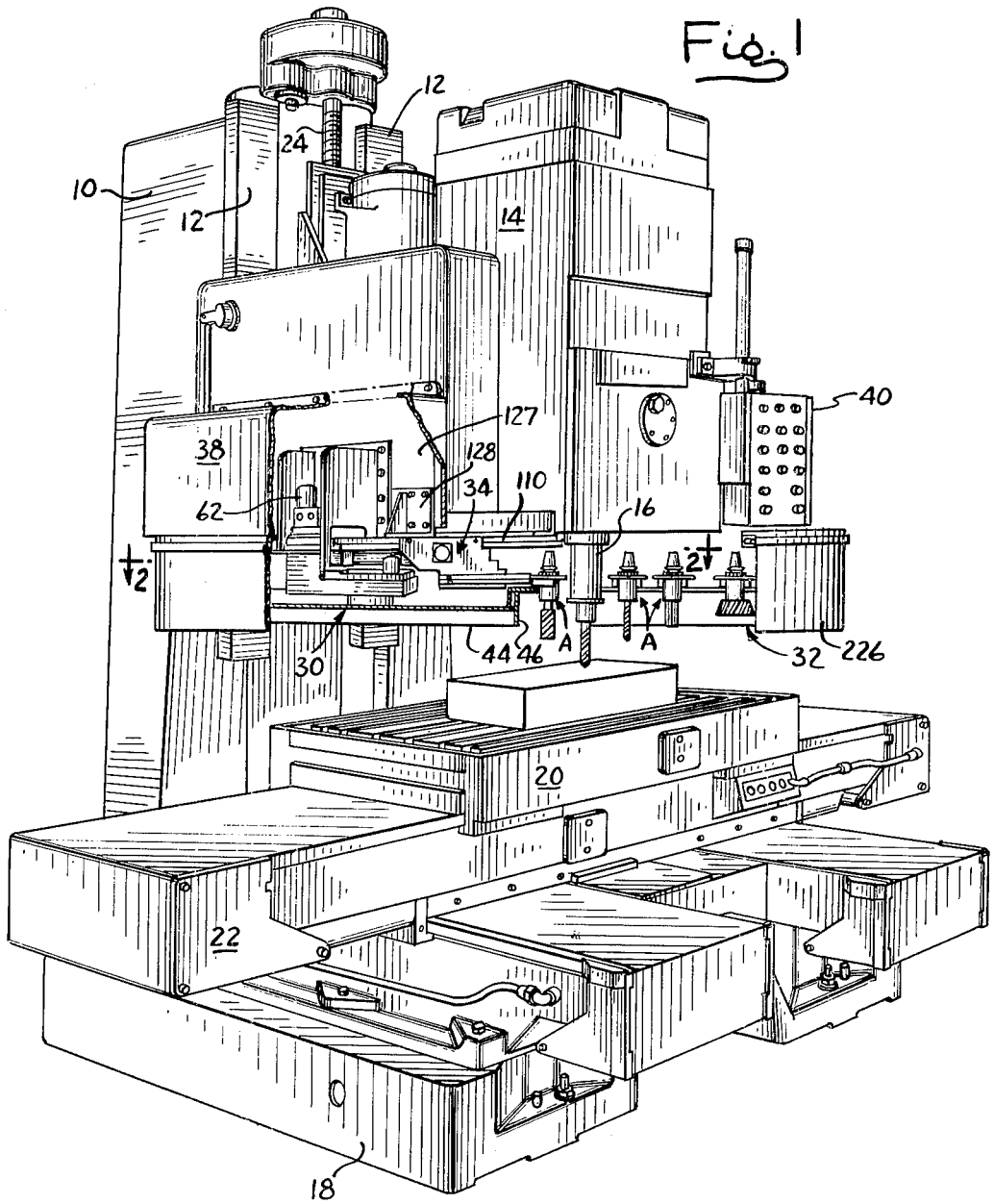
INVENTOR.
ROBERT A. LEHMKUHL
BY
Wolfe, Hubbard, Voit & Osann
ATTYS.

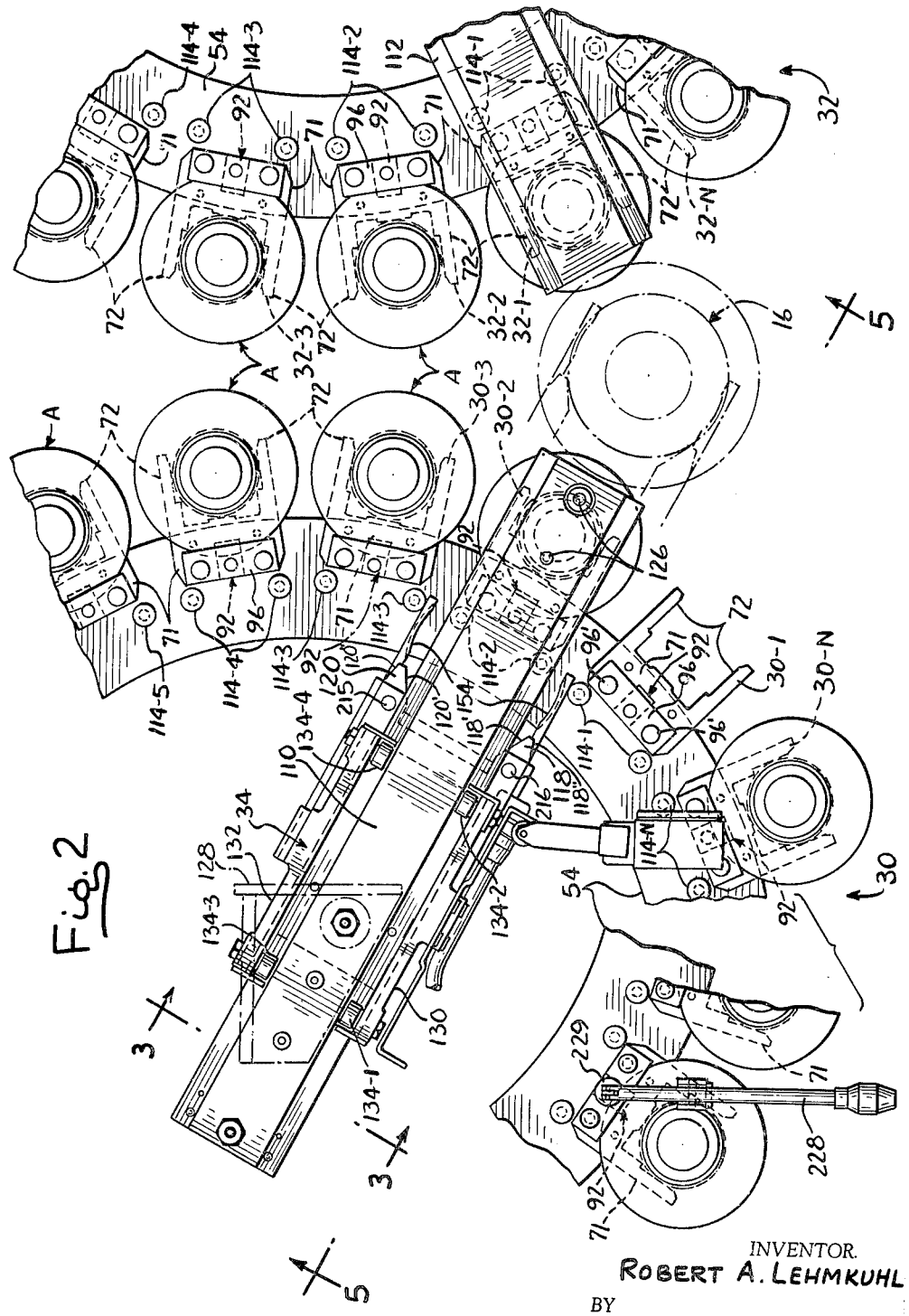

Aug. 17, 1965  R. A. LEHMKUHL  3,200,492
MULTIPLE USE MACHINE WITH TOOL CHANGER
Filed Aug. 27, 1962  9 Sheets-Sheet 3
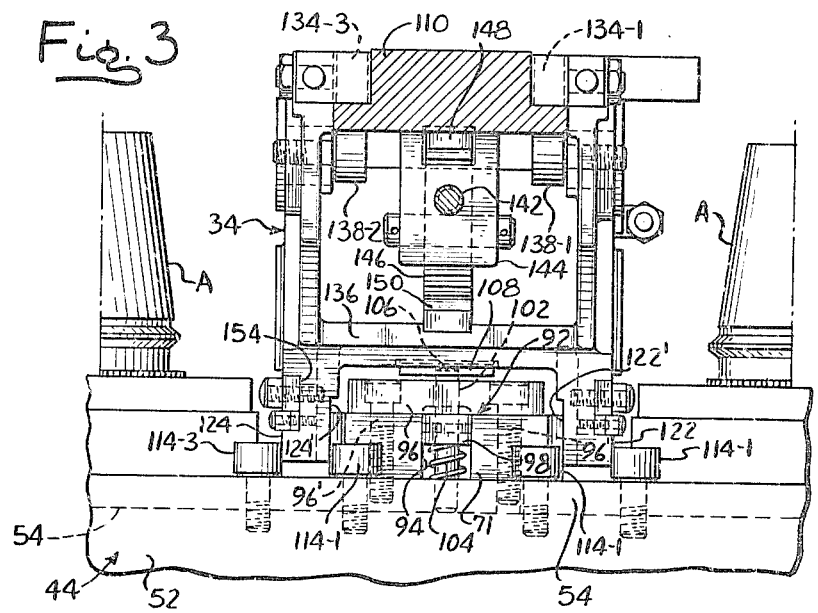
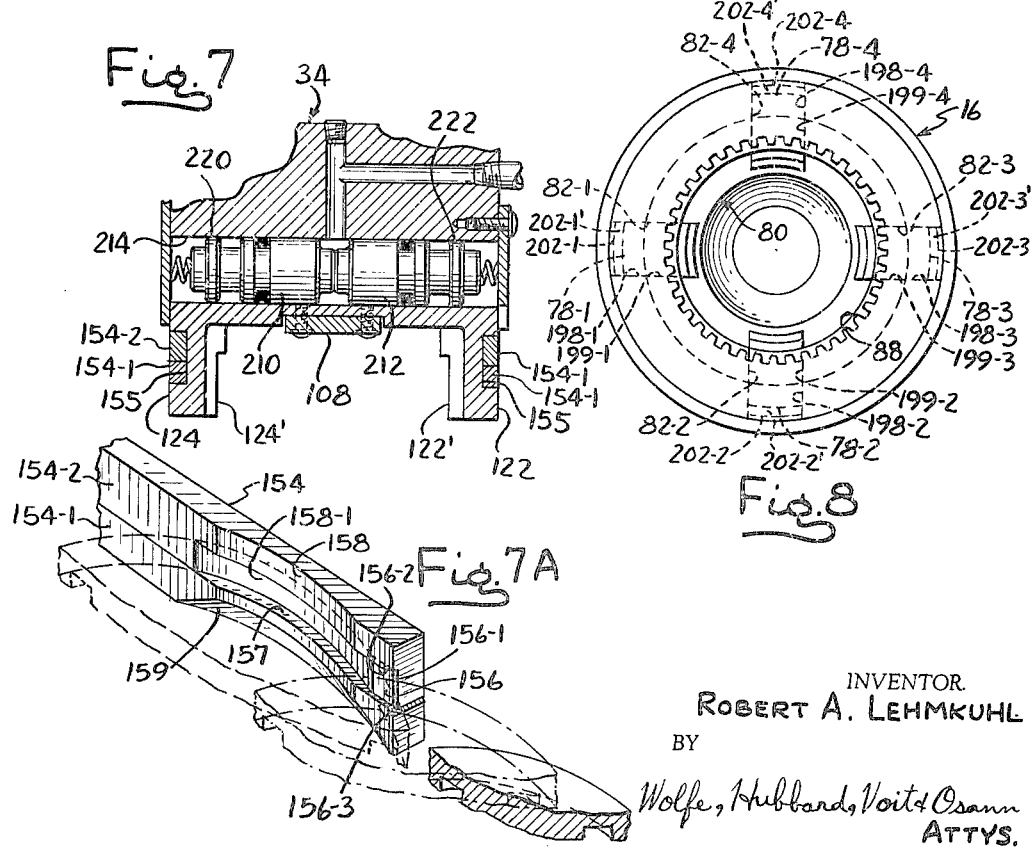
INVENTOR.
ROBERT A. LEHMKUHL
BY
Wolfe, Hubbard, Voit & Osann
ATTYS.

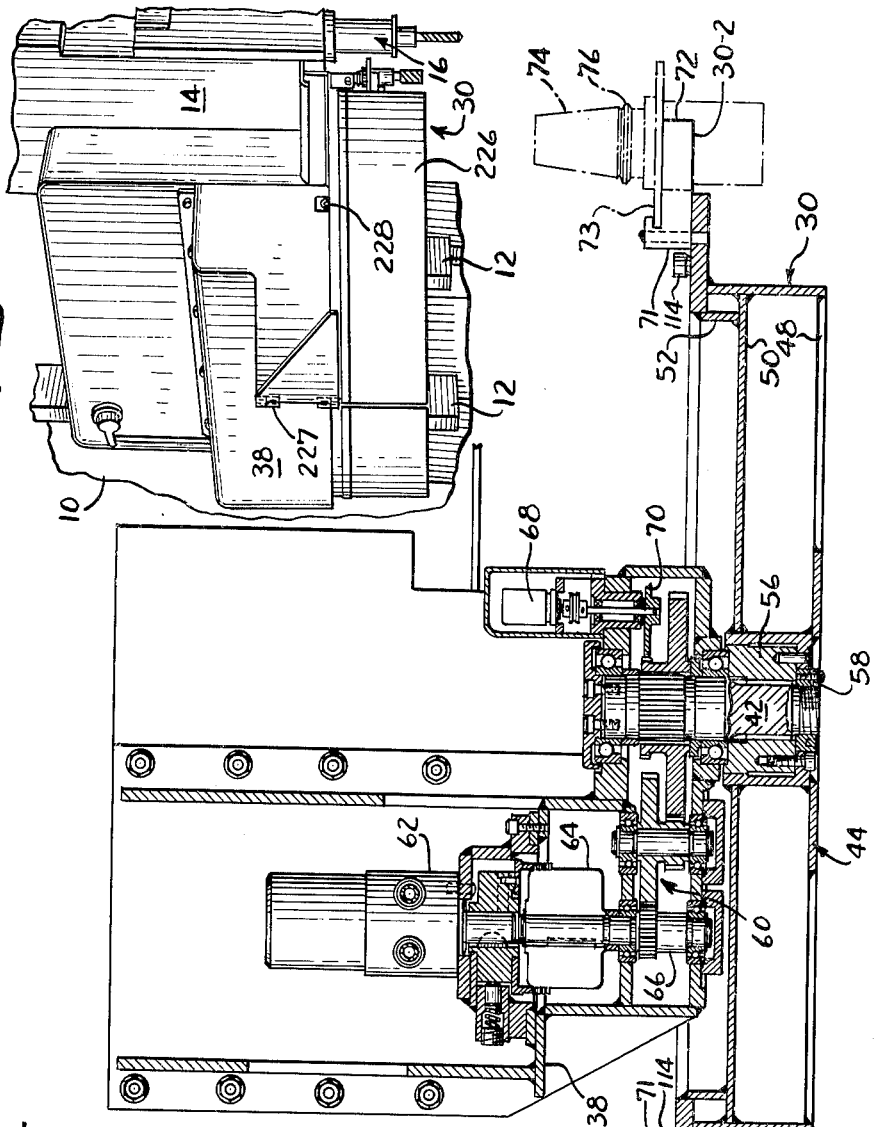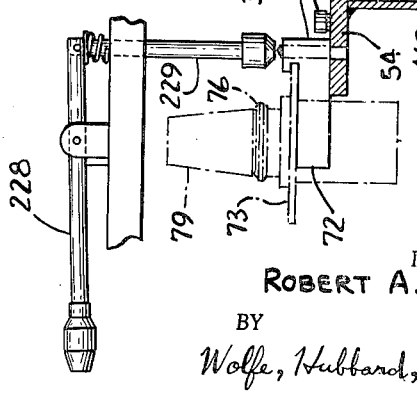

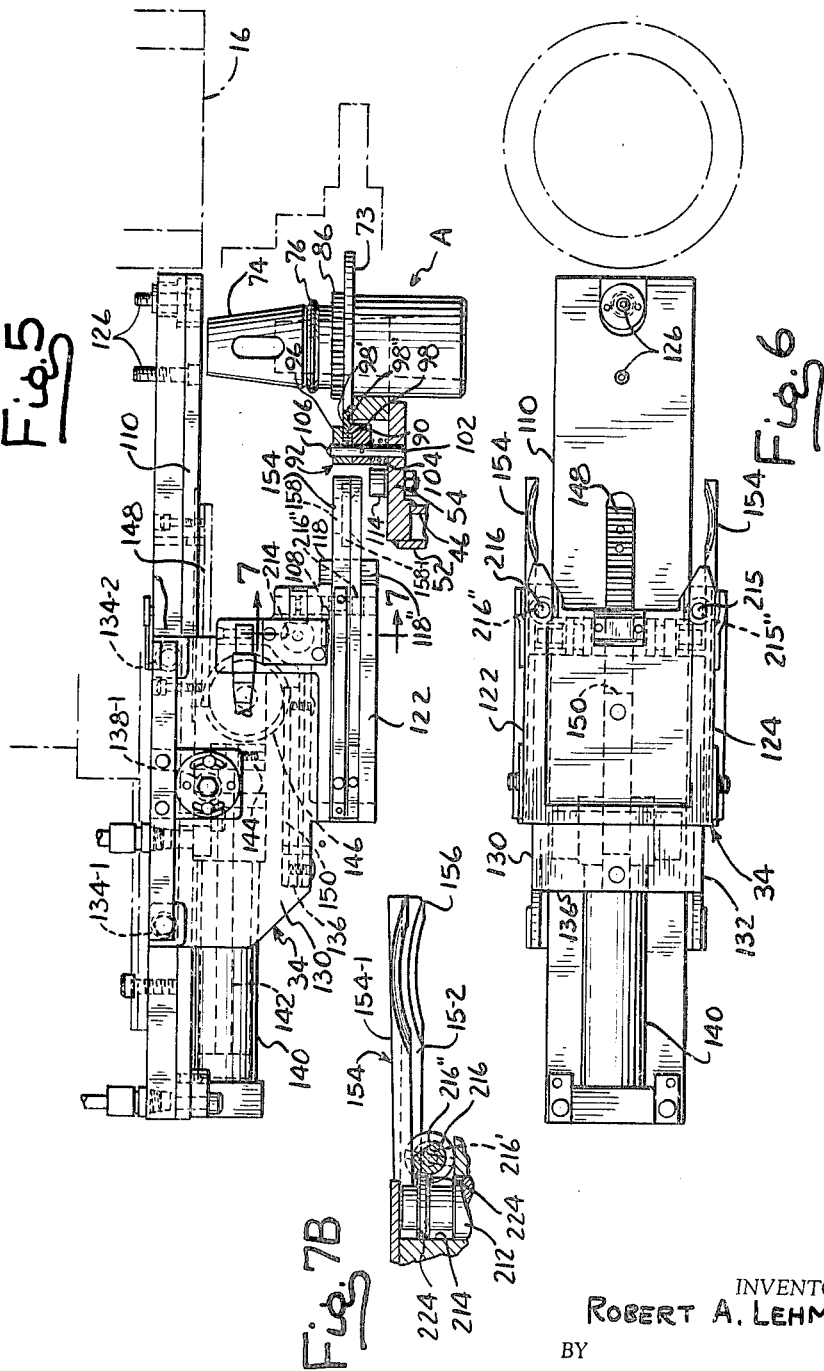

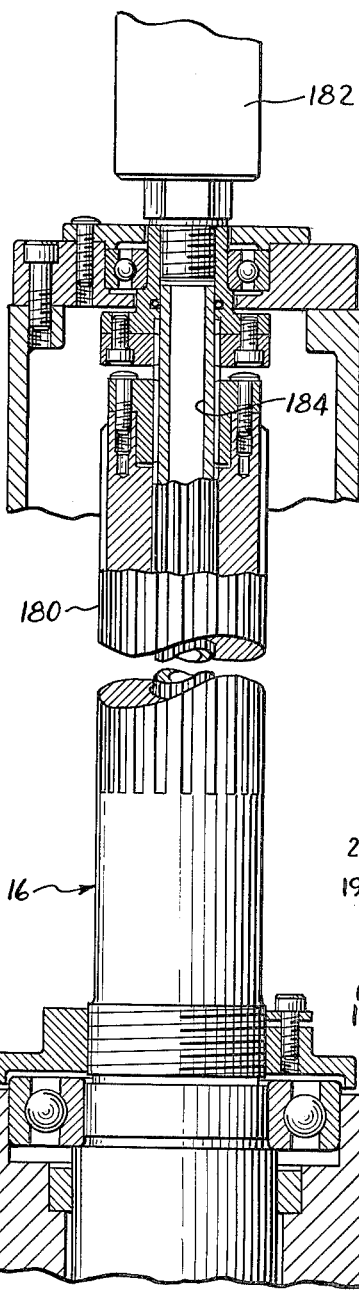
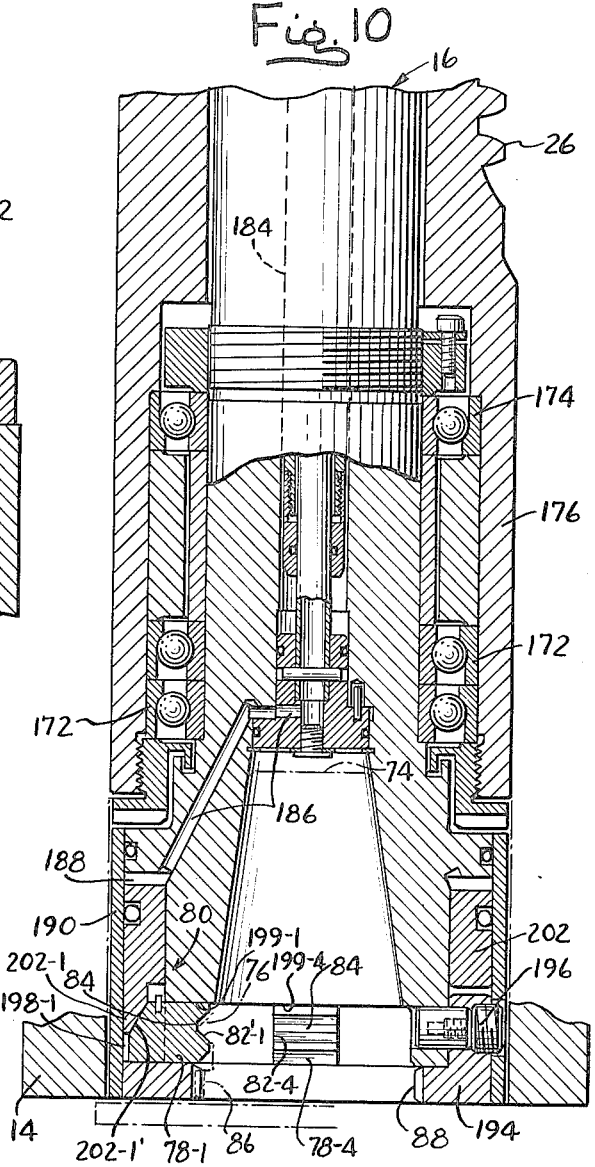

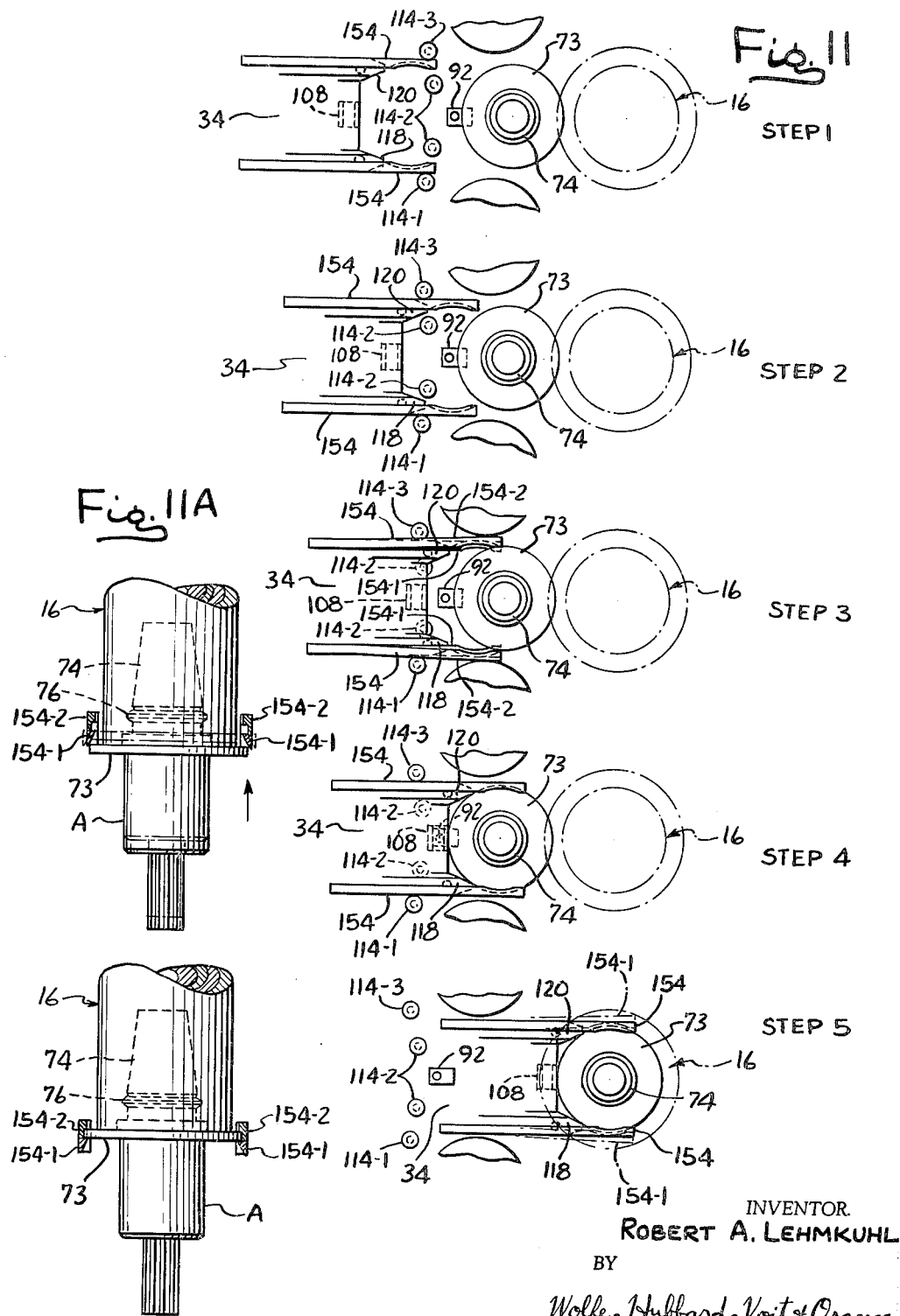

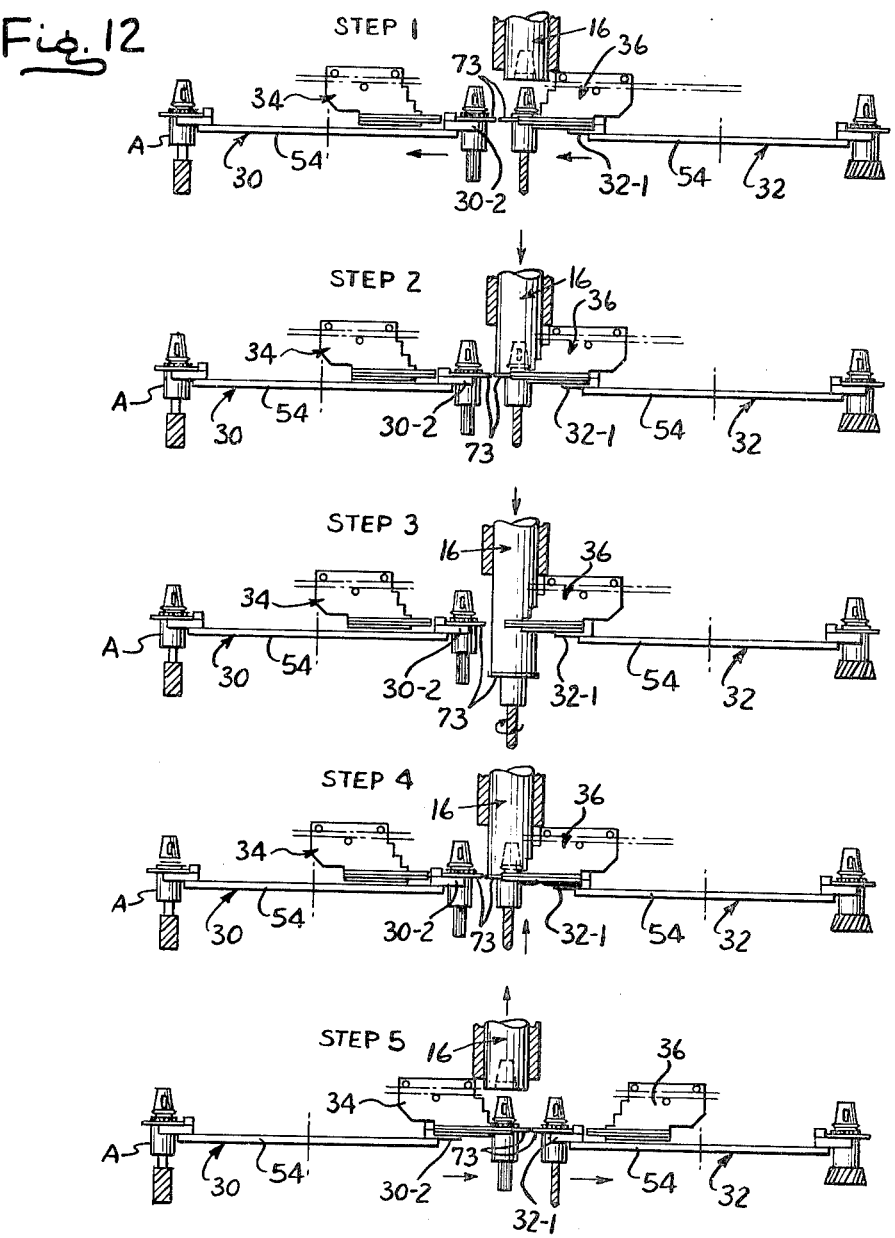

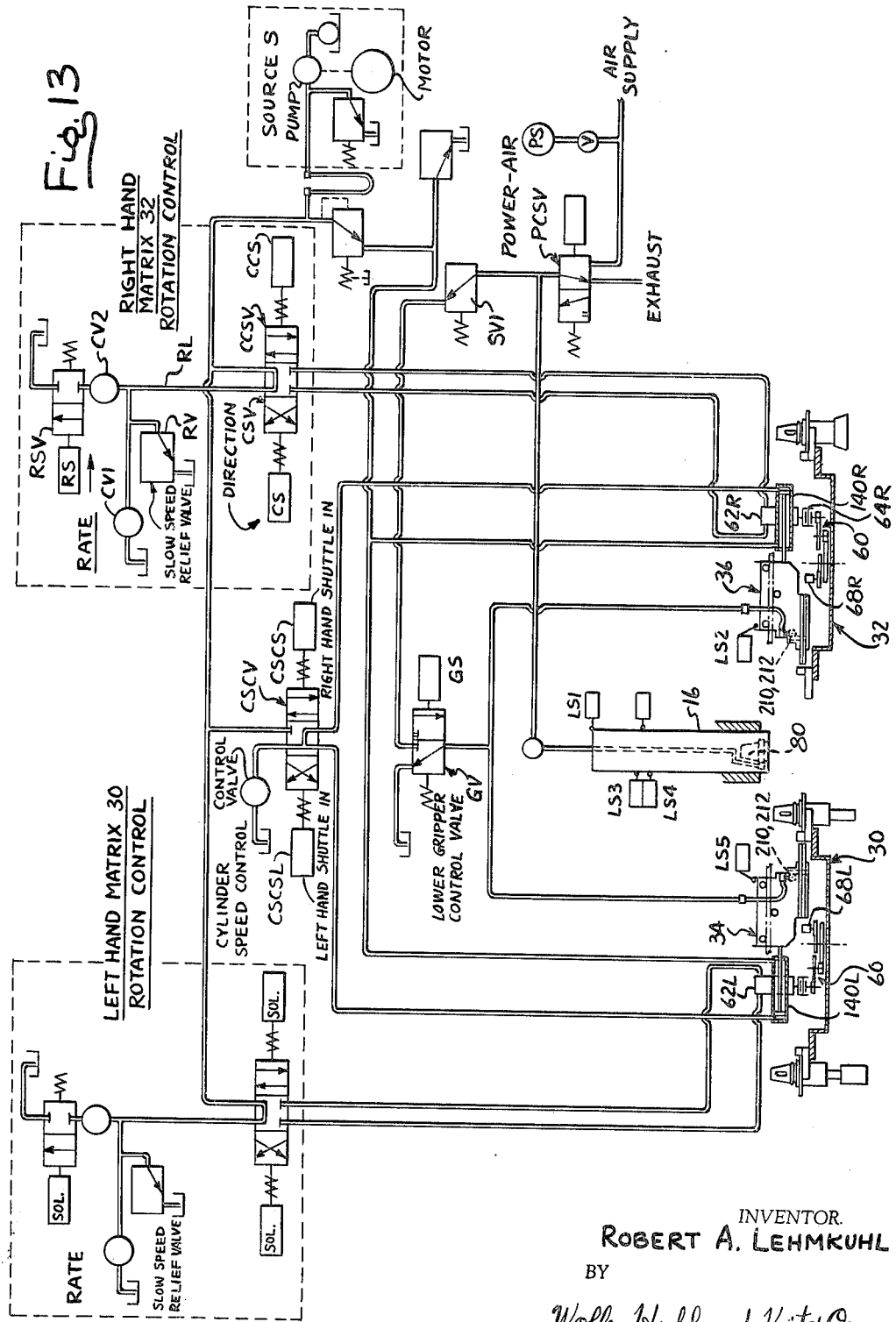

United States Patent Office 3,200,492
Patented Aug. 17, 1965

3,200,492
MULTIPLE USE MACHINE WITH TOOL CHANGER
Robert A. Lehmkuhl, Appleton, Wis., assignor to Giddings & Lewis Machine Tool Company, Fond du Lac, Wis., a corporation of Wisconsin
Filed Aug. 27, 1962, Ser. No. 219,538
14 Claims. (Cl. 29—568)

This invention relates to machine tools and more particularly to machine tools with automatic tool changing apparatus.

One of the objects of the present invention is to provide a high-production machine tool with automatic tool changer wherein the tool changer apparatus forms an integral part of the machine tool and is suited for high production having a very rapid tool change cycle with high capacity storage for tools and ready access to any tool.

Another object is to provide a tool changer mechanism having a simplified sequence of tool transfer operations.

Another object is to provide an upright drilling machine tool with tool changer apparatus that is so compactly merged into the construction of the machine tool that the finished apparatus occupies substantially the same floor space as the drilling machine tool without tool changer apparatus.

A related object is to provide means for supporting the tool storage matrixes of such tool change apparatus by the drilling machine headstocks.

Another object is to provide an improved tool changer apparatus of the type involving rectilinear movements of the tool during the transfer operation. In more detail it is an object of the invention to provide tool changer apparatus employing a shuttle movable linearly from a station adjacent a storage matrix, to a station adjacent the longitudinal axis of the machine tool spindle.

Another object is to provide faster tool change by employing a tool changer apparatus having dual matrixes and shuttles for transferring succeeding tools to the spindle from alternate matrixes.

A further object is to provide an improved shuttle having a simple, fool-proof tool gripper arrangement.

Another object is to provide means for supporting the dual matrixes and the shuttles of the tool changer apparatus from the machine tool headstock.

Other objects will appear from the following description taken in connection with the accompanying drawings, wherein:

FIGURE 1 is a front perspective view of a machine tool with tool changer apparatus, constructed in accordance with the present invention;

FIG. 2 is a fragmentary horizontal plan view taken substantially in the plane of lines 2—2 in FIG. 1, to show the dual matrix and shuttles;

FIG. 3 is a fragmentary elevational view of the shuttle mechanism for one matrix and support for the shuttle, taken substantially in the plane of lines 3—3 in FIG. 2;

FIG. 4 is a vertical sectional view of one matrix and drive;

FIG. 4A is a fragmentary front perspective showing the matrix housing which is broken away in FIG. 1;

FIG. 5 is an enlarged fragmentary side elevational view of the shuttle and track taken substantially in the plane of lines 5—5 in FIG. 2;

FIG. 6 is a fragmentary bottom plan view of the shuttle and track as shown in FIG. 5;

FIG. 7 is an enlarged fragmentary sectional view of the air actuator for the tool gripping elements on the shuttle, taken substantially in the plane of lines 7—7 in FIG. 5;

FIG. 7A is an enlarged fragmentary perspective view looking at the end of the gripping elements forming one arm;

FIG. 7B is an enlarged fragmentary sectional view to show the connection from the air actuator to the gripping elements;

FIG. 8 is an elevational view of the end of the spindle;

FIG. 9 is a fragmentary longitudinal sectional view of the upper end of the spindle and spindle chuck actuator;

FIG. 10 is a fragmentary longitudinal sectional view of the lower end of the spindle illustrating the spindle chuck;

FIG. 11 is a stop-motion view illustrating the operation of the tool gripping elements on the shuttle;

FIG. 11A is a stop-motion view also illustrating the operation of the tool gripping elements;

FIG. 12 is a diagrammatic view illustrating the tool change cycle sequence; and

FIG. 13 is a schematic illustration of a hydraulic control circuit for the tool changer apparatus.

While the invention is susceptible of various modifications and alternative construction, a preferred embodiment thereof has been shown in the drawings and will be described below in detail. It should be understood, however, that there is no intention to limit the invention to the specific form disclosed, but, on the contrary, the intention is to cover all modifications, alternative constructions and equivalents falling within the spirit and scope of the invention as expressed in the appended claims.

GENERAL MACHINE ORGANIZATION

Referring to the drawings, the invention while applicable to machine tools generally is illustrated in the form of a vertical spindle machine with tool changer apparatus. As shown more particularly in FIG. 1, the machine tool comprises an upright column 10 fashioned with vertical ways 12 slidably supporting a headstock 14 having a vertically movable spindle 16, and a bed 18 for slidably supporting a table 20 on which a workpiece is adapted to be carried for machining purposes. The work table 20 is slidably supported for horizontal movement on a saddle 22 to move the workpiece and thereby achieve relative motion between a cutting tool in the spindle 16 and workpiece on the table in the conventional Y direction. The saddle 22 is movable longitudinally to move the table 20 and thereby the workpiece and spindle mounted cutting tool relative to each other in the conventional X direction. Table and saddle feed screws for achieving table and saddle feed are preferably power operated through appropriate variable speed drives. Raising and lowering of the headstock 14 of the drilling machine by power along the vertical ways 12 of the column for adjustment purposes may be achieved by a power driven elevating screw 24. The vertically movable spindle 16 is movable by power to provide relative movement between the cutting tool and workpiece in the conventional Z direction by a power feed drive means herein shown in FIG. 10 as including a rack 26. Such table, saddle and spindle feed drives may be numerically controlled from a suitable source of programmed data to provide three axis control of relative workpiece and cutting tool position.

In addition to the foregoing components, the machine tool of the present invention includes storage means for tools which are adapted to be received in the spindle and tool changing means for transferring such tools between the storage means and the spindle. Still referring to FIG. 1, storage of tools is achieved in a unique and particularly advantageous way that contemplates simultaneous transfer of (1) a selected tool to the spindle and (2) return of the tool in the spindle to storage, thereby to achieve a rapid tool change cycle that will involve little or no loss of time in the high-production operating cycle of the machine tool. To this end, tool storage is provided by dual matrixes 30, 32 supported on the opposite sides of the vertically movable headstock 14. Each matrix (30 or 32) is rotatable about a vertical axis spaced a subtantial distance to the side of the axis of the spindle 16. Also referring to FIG. 2, such matrixes, in keeping with the invention, each define an annular ring of individual tool support elements (30-1 to 30-N and 32-1 to 32-N). Power means are provided as shown in FIG. 4 to rotate the annular matrixes 30 or 32 during a search step under manual or automatic control to position the individual tool support elements successively adjacent a tool transfer station, and to stop the matrix with a selected tool at such station whereby the selected tool may be transferred from matrix to spindle.

For transfer of tools between each matrix and the spindle, means are provided in the form of a horizontally movable shuttle 34 or 36 having means for holding a tool during the transfer operation. With separate matrixes each having a shuttle, it become possible to control the tool change cycle so that one shuttle returns the old tool from the spindle to one matrix, while the other shuttle transfers a selected tool from the other matrix to the spindle. A more rapid tool change cycle becomes possible utilizing the same time period for transfer of a new tool to the spindle as for return of the old tool from the spindle to the other matrix. It will be appreciated that this machine tool is adapted for numerically controlled operation, and that the steps of tool search, tool return and new tool transfer may be programmed steps in such operation as portions in any sequence of the tool change cycle, although the invention is not restricted to such an operating mode and is equally applicable to manually controlled machine tools.

DUAL MATRIXES

Referring more particularly to the matrixes 30 and 32 for tool storage, such are substantially identical in construction except for being of opposite hand, and the following description of the left-hand matrix 30 (as viewed in FIG. 1) is thus also applicable to the right-hand matrix 32. The matrixes are supported on either side of the headstock 14 by horizontally projecting housings 38, 40 respectively. As shown in FIG. 4, the matrix housing 38 supports a vertical, rotary matrix spindle 42 having an end portion projecting downwardly below the housing on which an annular matrix drum 44 is fixed. Each such drum is formed in the present case in a manner to provide a light yet rigid structure for carrying a large number of tools, by securing as by welding a circular rim 46 around a pair of spaced annular plates 48, 50. The upper edge of the rim 46 projects upwardly of the top annular plate 50, and with a circular collar 52 also fixed to the top plate 50, serves as means for carrying a flat ring 54 on which individual tool support elements 30-1 to 30-N are arranged equally spaced around the outside of the matrix drum 44.

At the center of each matrix drum 44 a bushing 56 is fixed thereto by any suitable means and to the projecting end of the matrix spindle 42. The end of the spindle 42 is threaded to receive a nut 58 which retains the bushing and drum from dropping off the spindle. Each drum and spindle are rotatable by means herein shown as a gear drive 60 mounted within the respective housing and connected to a hydraulic index motor 62. A releasable connection such as that afforded by a multiple disc electric clutch 64 between the motor and pinion shaft 66 serves to connect the motor to rotate the matrix. A continuous indication of position of the matrix is afforded for control purposes by means such as a signal generator or resolver 68 also supported in the housing and connected to the matrix spindle 42 through gears 70.

Turning also to FIGS. 2 and 4, for further details of the matrix equipped tool support elements, it will be seen such elements 30-1 to 30-N are carried by a flat ring 54 and extend outwardly thereof to support the tools. Each tool support element is in the form of a forked or C-shaped body 71 providing a pair of radially outwardly extending fingers 72 which fit on either side of the shank of a tool to support the tool from the matrix.

Tool adaptor

One of the features of the present invention revolves about the provision of a simple and fool-proof mechanism for gripping each tool while in the matrix and during the transfer operation by a shuttle. This mechanism involves a radially projecting flange 73 on the shank of the tool assembly, herein shown as provided by a tool adaptor A furnished for each tool. The tool adaptor A also provides a tapered shank 74 adapted to be received in the socket of the machine tool spindle 16. The taper of the shank 74 is preferred to be of the standard milling machine or non-sticking type to permit ready insertion and extraction of the adaptor in the machine tool spindle. Referring briefly to FIG. 10, which illustrates the lower end of the spindle 16, the shank 74 of each adaptor A is provided with an annular V-shaped ridge 76 which is adapted to cooperate with radially inwardly movable jaws 78-1 to 78-4 of a power chuck 80 in the spindle 16, the details of which are set forth in a later section. For present purposes, it is sufficient to note that adjacent the open end of the spindle 16 four such jaws 78-1 to 78-4 are mounted in radial slots 82-1 to 82-4. The inner facing ends of the jaws are formed with V-shaped notches 84 which are adapted to receive the annular V-shaped ridge 76 of a tool carrying adaptor A. Such jaws 78-1 to 78-4 are power actuated inwardly to engage the sloping forward surface 82' of the notches 82 in the jaws with the mating surface of the ridge 76 so that upon such inward movement of the jaws under power the tool adaptor A is forced by the resulting cam action between the mating inclined surfaces to seat the tapered shank 74 in the spindle socket.

Each tool adaptor A is also formed with a multiple tool external clutch 86 immediately behind the flange 73. The external teeth of this clutch 86 are spaced to engage with mating internal teeth of a spline 88 (FIG. 10) formed on the end of the tool spindle 16 to serve as a positive driving connection between the tool adaptor A and the spindle. In inserting a tool adaptor A into the spindle 16, the external teeth of the clutch 86 on the adaptor are engaged with the internal teeth of the spline 88 on the spindle, and the shank 74 of the adaptor A is inserted far enough into the spindle 16 to place the ridge 76 on the shank opposite the notches 84 in the chuck jaws 78 whereupon the latter upon being power actuated seat the adaptor solidly in the spindle and lock it in place.

In addition to the features cooperating with means on the spindle 16, each adaptor A is also formed with a circular projecting flange 73, the underside of which (as viewed in FIG. 5) is grooved to provide a downwardly projecting latching lip 90. Such latching lip 90 cooperates with means on the matrix 30 or 32 associated with each tool support element for latching a tool in place against accidental removal.

Matrix latch

Latching the tools in the matrix is achieved in the present instance with a latch mechanism 92 mounted on each tool support element of both matrixes. To receive the latch mechanism as shown in FIG. 3 which is a view looking at the back of the shuttle, track and tool support elements as seen from inside the matrix, the back of the body portion 71 of each tool support element is cut or notched out and the latch 92 is supported within the cavity 94 thus provided below a retainer plate 96 which extends across the upper exposed end of the cavity 94 being fastened to the body of the support element by spaced machine screws 96'. The latch 92 illustratively includes a finger 98 having a forwardly and upwardly projecting hook 98′, as seen in FIG. 5. Such finger 98 is fixed to a shaft 102 which is slidably supported for vertical movement in aligned bores in the retainer plate 96 and matrix ring 54. A spring 104 trapped between the latch finger 98 and the matrix ring 54 tends to lift the latch finger to an upward closed position, in which position it is shown in FIG. 5. The hook 98′ on the latch finger 98 in combination with the underside of the retainer plate 96 forms a recess into which the latching lip 90 on an adaptor flange 73 may easily enter. The latch finger 98 presents a sloping cam surface 98″ which is engaged by the entering adaptor flange 73 to move the fingers downward and facilitate such entry. With the latch finger 98 spring-biased to closed position the lip 90 and hook 98′ cooperate to secure the adaptor A within the fingers 72 of the tool support element, the flange 73 on such adaptor resting on the fingers to support the tool. Release of the tool assembly is achieved by moving the latch shaft 102 downwardly and for the purpose of actuating this shaft, the upper end 106 thereof is beveled and extends above the fixed retainer plate 96 where it may be engaged and forced downwardly by a suitable cam 108, which in the present case is mounted on the tool shutle.

*Matrix positioning (at tool transfer station)*

For support of the shuttles 34, 36 for horizontal movement between the matrixes 30, 32 and the tool spindle 16, a track 110, 112 is fixed above each matrix to the headstock. Referring particularly to the left-hand matrix 30 shown in FIG. 3, the track 110 extends substantially radially of the matrix 30 from a position toward the center thereof outwardly past the ring of the tool supports toward the spindle. The tool transfer shuttle 34 takes a tool which the matrix has rotated to a position under the track 110, at the tool transfer station, from such station to the spindle. The tool supports 32–1 to 32–N are numbered consecutively, for example, each matrix as shown has twenty tool support elements such that twenty tools may be supported thereon. A tool support on the matrix 30 is moved (by rotating the matrix via its power drive) to approximate vertical alignment with the shuttle track 110 to position the tool for transfer. A convenient and novel means for obtaining final accurate alignment of the matrix with a tool carried by a tool support thereof at the tool transfer station or position is provided in the present case by means on the shuttle which as an incident to its movement past a tool at approximate transfer position or station engages and cooperates with means on the matrix 30 to move the matrix into final alignment. How this is achieved may be seen by referring to FIG. 2. Adjacent the backside of the tool supports 30–1 to 30–N are pairs of upwardly extending rollers 114–1 to 114–N which are carried by the matrix ring 54. The front end of the shuttle 34 is provided at each side with a tapered projection 118, 120 which presents inwardly facing inclined stop surfaces 118′, 120′ and outwardly opposed cam surfaces 118″, 120″. The inwardly facing stop surfaces 118′, 120′ are adapted to engage the flange 73 of an adaptor A of a tool in a tool support of the matrix at the transfer station, as the shuttle moves along the track from its position inward of the periphery of the matrix, toward the transfer station to pick up such tool. The outwardly opposed cam surfaces 118″, 120″ are adapted to engage single rollers 114–1, 114–3 of the roller pairs associated with the adjacent tool supports 30–1, 30–3 respectively, as an incident to shuttle movement. It will be seen from FIG. 2 that the outwardly opposed cam surfaces upon engagement with such rollers 114–1, 114–3 will turn the matrix through a small angle which is free to rotate to a final aligned position. Furthermore, the outside surfaces 122, 124 of the shuttle serve as a shot pin to maintain accurate alignment and to lock the matrix in the selected tool transfer position while the shuttle moves forwardly from the tool transfer station toward the spindle. While other arrangements may be suitable, as seen in FIG. 2, it is preferred to allow a little clearance between the inner sides of the shuttle and the inner rollers 114–2 to avoid interference and to guide on the outer set of rollers made up of one roller from each adjacent pair 114–1 and 114–3. The length of the shuttle is such that the guide surfaces thereof will overtravel the rollers when the shuttle is in its forward position carrying a tool under the spindle. In this forward position, the tool support blocks 71 on the matrix interfit with the inside surfaces 122′, 124′ of the shuttle sides to prevent the matrix from drifting out of position.

TOOL TRANSFER SHUTTLES

With either matrix 30, 32 positioned with a new or selected tool at the respective transfer station, a tool transfer means is operable to pick up a tool at such transfer station and move it toward the spindle 16. The present invention provides for this purpose the linearly movable tool shuttles 34, 36. Such shuttles are supported by and movable along a fixed track 110, 112 which at the spindle end of the track is secured to the underside of the headstock by means such as screws 126 and at the other end is secured to the side of an arm 127 by means such as a bracket 128. This bracket 128 affords adjustment of the end of the track 110 so that it may be aligned between the vertical axis of the tool spindle 16 and the axis of the matrix. It is well to keep in mind that while this description is directed toward the left-hand matrix 30, the left-hand shuttle 34, and its track 110, the right-hand matrix 32, shuttle 36 and track 112 therefor are similar and the description applies equally.

Each shuttle 34, 36 is formed of a pair of side plates 130, 132 (FIG. 6) which are suspended from rollers 134–1 to 134–4 carried on the top of such side plates 130, 132 on the inner facing surfaces thereof and located to roll along the upper marginal edges of the track 110. Such vertically extending side plates 130, 132 are connected a substantial distance below the track by a horizontal member 136 spanning such plates, with a portion of such side plates extending below the spanning member to engage the rollers 114–1, 114–2, 114–3 on the matrix flange and to straddle the tool support 30–2 at the transfer station while the spanning member 136 which is raised clears such tool support.

To retain the shuttle 34 on the track 110 and limit vertical play thereof, a pair of rollers 138–1, 138–2, one on the inner surface of each side plate 130, 132 are positioned to directly engage the undersurface of the margins of the track 110, and such rollers are provided with eccentric adjustment so that they may be moved into firm abutment with the track and held in such abutting position to eliminate vertical play and thereby retain the shuttle so that it moves smoothly without jumping action along the track.

To move the shuttle, power means are provided, herein shown as a hydraulic cylinder 140 the body of which is fixed adjacent the underside of the track 110. The piston rod 142 of the cylinder 140 is attached to a driving yoke 144 which rotatably supports a pinion gear 146. The upper surface of the yoke 144 is longitudinally slotted to receive a downwardly facing rack 148 which meshes with the pinion 146 and is fixed to the track so that the sides of this rack 148 serve as a guide for the yoke 144 in its longitudinal movement under power from the cylinder 140. The pinion 146 also meshes with an upwardly facing rack 150 fixed to the shuttle 34, such that longitudinal movement of the yoke 144 under power along the fixed rack 148 rotates the pinion 146. Rotation of the pinion 146 moves the shuttles 34 via the shuttle rack 150 and at twice the speed of the piston rod 142 and yoke 144 carried thereby.

*Shuttle tool grippers*

In order to hold a tool during the transfer operation of a tool change cycle, each shuttle is provided with means for gripping a tool by means of its adaptor A. It will be recalled that the tool adaptors A are provided with a projecting flange 73. In keeping with the present invention, the gripping means on the shuttle includes as shown in FIGS. 2 and 5 spaced gripping arms 154 which are located to straddle this flange 73 on a tool adaptor A and to grip the tool adaptor by means of the flange. This will be more readily observed in connection with FIGS. 5 and 6 which illustrate that the shuttle 34 has gripping means herein shown as a pair of forwardly projecting arms 154 which as appears in FIGS. 2 and 5 will straddle the adaptor A of a tool carried by a matrix tool support 30-2.

In keeping with the present invention, the gripping means on the shuttle 34 is operable to engage or to release the adaptor A of a tool upon relative movement between the shuttle and the adaptor in either of two directions: (1) radially of a tool adaptor or (2) axially of a tool adaptor. This is achieved in the present case by forming each arm 154 which extends forwardly from the shuttle of two elements 154-1, 154-2 which extend horizontally and are arranged one on top of the other, and wherein one of such elements is more flexible than the other. The arms 154 formed by these elements while projecting forwardly of the shuttle 34 also have portions which extend along the sides of the shuttle, the outer surfaces of the side of the shuttle side plates having longitudinally outwardly facing recesses 155 to receive such elements.

While both gripping elements forming each arm 154 are flexible, the lower gripping element 154-1 is made rather slender and more limber so that the set of such opposite elements 154-1 may be forced apart by power a substantial distance and returned from such position by the inherent flexibility of the elements in order to engage and release the flange 73 on a tool adaptor A in cooperation with the companion, relatively more rigid, less flexible upper set of gripping elements 154-2. This is shown by FIG. 11 which is a stop motion view illustrating the operation of the arms. It will be seen also from this view that the upper set of elements 154-2 is sufficiently flexible to be urged apart mechanically, as in the course of movement of the shuttle toward the tool transfer station, to pick up the tool. For spreading the upper elements upon mechanical engagement with the adaptor flange 73, as shown in FIG. 7A each such element 154-2 has a camming surface 156 leading toward the tip which upon engagement with the curved flange 73 of an adaptor, cams such upper elements apart so as to slide around such flange. The lower set of gripping elements 154-1 are shown in an inner closed position in FIG. 7A, and in this position provide a seat 157 on which the flange 73 of an adaptor rests after the upper elements have slid around the flange. From FIG. 7A it will also be clear that the elements of each arm together define an opening at the tip of the arms in which the flange of an adaptor will be guided both vertically and horizontally by alignment bevels 156-1, 156-2, 156-3. As appears in FIGS. 5 and 7A, the upper elements 154-2 together define an opening having a smaller section 158 which is concentric with the shank of a tool adaptor A, and a larger diameter section 158-1 which conforms to the outer edge of the flange 73 on the adaptor A.

Referring to FIGS. 7A and 11A, it will be observed that the lower elements 154-1 may be cammed apart by the vertical movement of the flange 73 in an adaptor to return a tool adaptor to the gripping arms of the shuttle. For this purpose the lower elements 154-1 together define a surface 159 in the form of a frustrum of a cone with the larger section of the cam opening downwardly. Such elements 154-1 having a surface 159 inclined downwardly and outwardly are cammed outwardly upon engagement with such surface of the flange of a tool adaptor A upon movement of the flange upwardly between such arms, as seen in FIG. 11A, upon upward movement of the adaptor A and tool by the spindle during the tool change cycle. This is diagrammatically depicted as step 4 of FIG. 12.

It will thus be seen that both elements of each gripping arm 154 are spread apart to pick up and release the adaptor A of a tool, and for this purpose are flexible. Briefly reviewing the different steps of the tool change cycle where this feature is involved, referring to FIG. 11, it will be recalled that to start the tool transfer operation the shuttle 34 moves forwardly to pick up a tool in the matrix 30 so as to carry the same forward to the spindle 16 (steps 1–4) and as an incident to such movement (step 4) the shuttle releases the matrix latch mechanism 92 and substantially simultaneously will engage the tool adaptor A. The upper tool gripper elements 154-2 will be spread apart (steps 3, 4) sufficiently to slide around the adaptor so that the arm will straddle the flange 73 of the tool adaptor A with the adaptor flange 73 resting on the seat 157 provided by the lower elements. Having released the matrix latch mechanism 92, the shuttle 34 is then free to move along the track 110 to transfer the selected tool from the matrix 30 into a position in longitudinal alignment with the spindle 16.

With dual matrixes 30, 32, and separate shuttles 34, 36 for transferring tools to and from the spindle 16 and such matrixes, a wide variety of different sequences may be carried out in a tool change cycle. FIG. 12, however, illustrates a typical cycle which takes advantage of the separate matrixes and shuttles and utilizes such to permit a rapid tool change cycle. In this cycle in steps 1 and 2, the tool is carried to position in axial alignment with the spindle 16, and the spindle 16 is moved downwardly so that the shank of the tool adaptor A is received in the spindle socket. At this point in the cycle a power chuck is operated to secure the adaptor in the spindle.

Thereupon the lower set of gripping elements 154-1 are spread apart by power means so as to permit the tool adaptor flange to escape upon downward movement, as depicted in step 5 of FIG. 11, so that the spindle 16 may be moved downwardly to position the tool in cutting engagement with the workpiece. As soon as the tool adaptor flange has been moved downward from between the gripping elements 154-1, power to such elements is cut-off and they spring back to their normal position in which they straddle the spindle 16, as shown in FIG. 11A for example, having clearance therewith so that the spindle is free to rotate.

SPINDLE POWER CHUCK

Now referring to FIGS. 9 and 10, as mentioned above the spindle is equipped with a power chuck that serves to secure the tool adaptor A in the spindle. From the diagrammatic illustration in FIG. 12 of the operating cycle of the drilling machine tool, it will be clear that the shuttle 34 carries a selected tool element during the transfer phase of the tool change cycle, to position in axial alignment with the spindle. The spindle is then moved downwardly to receive the tool adaptor, and in connection with this operation the power chuck 80 is operated to seat the tool adaptor A solidly in the spindle socket and to lock the adaptor in place. Cutting operations are carried out by lowering the spindle 16 to engage the cutting tool with the workpiece, without withdrawing the shuttle, the gripper arms 154 on the shuttle 34 having clearance with the cylindrical outer surface of the spindle.

To this end, the spindle as shown in FIGS. 9 and 10 is rotatably mounted by bearings 172, 174 within a sleeve 176 which in turn is translatably supported within the headstock 14 for axial projection therefrom. For a more detailed description of means for feeding and for rotating the spindle 16, reference may be made to copending application of Reichert and Lehmkuhl, Serial No. 136,703, filed September 5, 1961, entitled "Radial Drilling Machine and Counterbalance Therefor." While the rotatable spindle 16 in said application is shown in connection with a radial drill, the drive and feed means for the spindle is generally applicable to the spindle in the present upright drilling machine tool. In general, translation of the spindle 16 is achieved by means such as a rack and pinion drive, the rack 26 thereof being provided along an upper portion of the sleeve 176. Rotary drive of the spindle 16 within the sleeve 176 is achieved by gear means engaging external gear teeth 180 (FIG. 9) on an upper portion of the spindle.

Still referring to FIGS. 9 and 10 for details of the power chuck 80 for releasably securing a tool adaptor A in the tapered socket of the spindle, in the present case, the chuck 80 is powered by compressed air supplied from a suitable source through a fitting 182 mounted at the upper end of the rotatable spindle 16, and a conduit 184 leading downward from the fitting 182 through the center of the spindle to the power chuck 80 at the lower end thereof leads compressed air via such fitting to the power chuck. Passages 186 in the lower end of the spindle connect the conduit 184 to an annular recess 188 which, with a sleeve 190 fitting over the spindle, forms a cylinder housing a chuck actuating piston 192. A drive plate 194 attached by pins 196 to the front end of the spindle and to the sleeve 190 closes the end of the recess 188.

Radial slots 198–1 to 198–4, four of which slots are shown in the drive plate 194, align with radial slots 199–1 to 199–4 in the front end of the spindle 16. Chuck jaws 78–1 to 78–4 are slidably retained in the aligned slots for radial movement. To actuate the jaws 78 and force them inwardly an annular actuating piston 202 is provided which carries four forwardly extending projections 202–1 to 202–4 which have inclined cam surfaces 202–1' to 202–4' adapted to engaged inclined surfaces on the jaws 78–1 to 78–4 and thereby provide a camming action to force such jaws radially inwardly. The inner ends of the jaws are formed with V-shaped notches 84, as mentioned hereinbefore, adapt to engage the annular V-shaped ridge 76 on the shank of each tool adaptor A. Upon being forced inwardly by the actuating piston 202, the jaws 78–1 to 78–4 via the forward inclined surfaces of the V-shaped notches 84 in the ends thereof engage the mating inclined surfaces on the V-shaped ridge 76 of the tool adaptor A to move the adaptor upwardly in the spindle socket to seat the adaptor and lock it therein.

In order to permit a tool adaptor A to be inserted into the spindle socket, and to be removed therefrom, means are provided to return the actuating piston 202 and thereby remove any actuating force from the jaws 78. Such return means are herein shown as springs 206 located between the piston and driver plate. The jaws 78 are free to slide so that the latter will be cammed outwardly by direct engagement with the ridge 76 on a tool adaptor A, as for example upon downward movement of the spindle 16 toward an adaptor A positioned below the spindle, as diagrammatically depicted in step 2 of FIG. 12. Similarly, upon raising the spindle 16 above an adaptor A held therebelow, as in step 5 of FIG. 12, the jaws 78 will be pushed outwardly so as to permit separation of the spindle from the adaptor.

MACHINE TOOL OPERATING CYCLE

Before turning to an illustration of a specific operating sequence of the machine tool including tool change cycle, it will be understood that a wide variety of different specific sequences may be followed to suit the machining steps involved, the particular tools, or to account for other factors. In general, however, it is to be noted that in accordance with the invention, dual matrixes 30, 32 are provided so that tools may be taken alternately from one and then the other matrix, shortening the overall period of the tool change cycle because different steps thereof may be carried out simultaneously using both shuttles 34, 36.

For example, as shown in FIG. 12, in step 5 both shuttles are being employed for simultaneous transfer of a selected tool from the left-hand matrix 30 to the spindle 16 by one shuttle 34, and return by the other shuttle 36 of the tool used in the previous machining cycle to the right-hand matrix 32. The next subsequent tool change cycle may involve search of the right-hand matrix, during the prior machining step, and transfer of the selected tool from such right-hand matrix to the spindle, shown as step 1 in FIG. 12.

Still referring to FIG. 12, step 1 shows the spindle 16 fully retracted within the headstock 14 and the selected or "new" tool after being carried forward by the right-hand shuttle to the spindle transfer position in axial alignment with the spindle.

Referring now to the stop motion view FIG. 11 step 1 of this figure illustrates a shuttle (34 or 36) during an initial stage of its forward movement from a fully retracted position behind the tool transfer station of the associated matrix 30 or 32. As the shuttle advances under power, the projections 118, 120 engage certain ones of the guide rollers 114–1, 114–2, 114–3 on the matrix and thereby accurately align the latter as an incident to the shuttle movement as shown in step 1 and step 2. Both sets of elements 154–1, 154–2 forming the gripping arm then engage the flange 73 of an adaptor A of a tool carried by the tool support (30–N or 32–N) at the transfer station. Such engagement causes the arms 154 to spring apart, as shown in step 3, until the inside surfaces 118', 120' on the projection or guide on the shuttle move into abutment with the flange and, as shown in step 4, the arms return into embracing relation with the flange on the adaptor A. At this point in the forward advance of the shuttle the latch mechanism 92 on the tool support is released by the actuating cam 103 on the shuttle, thereby to release the adaptor A and tool to be carried forward to the spindle 16, as shown in step 5.

To insert the tool adaptor A carrying the selected tool into the spindle socket, the spindle is lowered as shown in step 2 of FIG. 12 by actuation of the spindle feed. When the spindle is in position to clamp the tool adaptor A, as shown in step 2 of FIG. 12, the power chuck 80 is operated.

It will be appreciated that the construction of the gripper elements 154–1, 154–2 of the shuttle eliminates the necessity of operating such gripper elements by power means except for the immediately succeeding step involving release of the tool adaptor A for movement of the spindle downward toward the workpiece, as shown as step 3 in FIG. 12. The procedures of pick up of a tool adaptor at the tool transfer station by the shuttle and dropping off a tool adaptor at such station upon return of the shuttle is achieved without power actuation of the gripper elements, but merely by mechanical actuation of such elements through engagement with the tool adaptor flange 73 as an incident to linear shuttle movement causing the elements to spring apart around the flange, as shown in FIG. 12.

Referring now to FIGS. 7, 7B and 12, to actuate the lower set of gripper elements 154–1 on each shuttle 34 or 36 to release the adaptor A for movement as in step 3 of FIG. 12, means are provided on each shuttle herein shown as a pair of opposed air actuated pistons 210, 212. Such pistons are received in a horizontal cylinder 214 defined in the body of the respective shuttle and located a substantial distance above the gripping arms 154. Movement of each piston 210, 212 is conveyed to actuate one gripping element of the lower set 154–1 by a vertical rod 215, 216 which is journalled in a bore perpendicular to and intersecting with the recess 155 in the side of the shuttle that receives the associated gripping element. The rod 215, 216 has a relieved section 215', 216' adapted to clear the upper gripping element 154–2. It also has a cam section 215'', 216'' adapted to engage the lower gripping element 154–1 and move the same upon rotation of the rod.

In the present case the rod 215, 216 is adapted to be oscillated through an angle of approximately 60° by the associated actuating piston 210, 212. Each piston is provided with a land 220, 222 which is received in a cut-out section 224 of a ring fixed to the motion transmitting rod 215, 216 to provide a connection which translates motion of the piston to oscillation of the rod.

Upon admission of pressure fluid between the pistons 210, 212, the latter will be forced outwardly thereby causing lower set of gripping arm elements 154-1 to be power spread as shown in FIG. 7B, and in broken lines in step 5 of FIG. 11.

Accordingly, with the spindle lowered to position the cutting tool in engagement with the workpiece as shown in step 3 of FIG. 12, the spindle drive is started to rotate the spindle to perform the cutting operation.

At the compeltion of such cutting operation, the spindle is retracted as shown in step 4, FIG. 12. The lower set of gripper elements 154-1 are cammed apart (as shown in FIG. 11A) upon engagement by the flange 73 on the tool adaptor A with the conical camming surface defined between such lower set of elements, to snap the flange 73 through the bottom set of elements against the upper set of elements 154-2 and thereby lock the adaptor A within the gripping arms.

With the left-hand shuttle 34 fully retracted in steps 1, 2 and 3 of FIG. 12, the left-hand matrix 30 may be searched for a new tool, according to programmed data and under the direction of a numerical control system. The matrix during such search step will be rotated to position the tool support at the programmed location No. 1 to No. 20, in the transfer station as shown in step 4 of FIG. 12, with the selected tool in the particular location ready for transfer by the left-hand shuttle to the spindle. This is shown in step 5 of FIG. 12 which depicts the right-hand shuttle being retracted to return the old tool to the matrix, and the left-hand shuttle at its forwardmost position with the tool carried thereby in axial alignment with the spindle.

Referring now to FIG. 13, a diagrammatic illustration of a control circuit for the apparatus, an operation sequence will be briefly summarized. The machine tool is ready for automatic operation after the tape or other record of programmed data is placed in the control apparatus, and the tools required for a particular program of machining operations are loaded in the matrixes. To insert tools in each matrix, access is provided to the tool supports 30-N, 32-N thereof through the matrix cover 226 (FIG. 4A) which has a hinged portion 227 that may be swung away to provide an opening. To release the latch mechanism 92 of a tool support 30-N positioned at the access opening, and thereby permit a tool to be removed from such support, a lever 228 which projects through the cover 226 is provided, such lever being manually operable to move an actuator 229 down into engagement with the upper end 106 of the latch shaft 102, to open the latch and release a tool adaptor A. With the old tool removed, a new tool may be placed into the tool support, and the matrix rotated manually or by power to position a different tool support adjacent the opening until both matrixes have been loaded with the required tools.

Assuming that the tape calls for the tool change from the right-hand matrix 32 in a given operation sequence, the resolver 68R through a suitable circuit energizes one or the other of a pair of rotary direction solenoids CS or CCS which via solenoid valves CSV or CCSV actuate the indexing motor 62R by connecting such indexing motor to a source S of pressure fluid to rotate the matrix 32 clockwise or counterclockwise to move the selected tool toward the transfer station. This resolver 68R and circuit also energizes a rate solenoid RS until the matrix nears final position, whereupon the resolver 68R deenergizes the rate solenoid RS thereby forcing return fluid from the indexing motor through the return line RL to flow to the slow speed relief valve RV which is set to throttle the return flow to slow down the speed of rotation of the matrix 32. Control valves CV1 and CV2 provide means for adjustment of fast matrix rotational speed.

When the selected tool reaches preferably approximately a degree or less of the desired position the resolver 68R is satisfied and deenergizes the direction solenoid CS or CCS. The clutch 64R between the hydraulic indexing motor 62R for the right-hand matrix 32 is also energized from the resolver 68R during the period of rotation of the right-hand matrix toward final position to locate the selected tool at the tool transfer station. With the matrix located within a degree or less of the desired position, and the spindle raised to actuate an upper limit switch LS1, the electric clutch 64R will be deenergized and the matrix will thus be free to rotate through the remaining angle to its final position as an incident to the movement of the shuttle toward the selected tool.

With the matrix approximately at its final position, the right-hand shuttle will be moved to engage in the transfer operation upon energization of the cylinder speed control solenoid CSCS for the right-hand shuttle. Energizing this solenoid CSCS causes the associated solenoid valve CSCV to connect fluid pressure from the source S to the power cylinder 140R for the right-hand shuttle, thereby moving the shuttle toward the spindle 16. The shuttle will pick up the selected tool at the tool transfer station and carry such tool into position in axial alignment with the spindle 16. As the shuttle reaches the end of its stroke, a switch LS2 is tripped. Operation of the switch LS2 through the control circuit energizes the drive for lowering the spindle 16, thereby moving the spindle down toward the tool held below the spindle by the right-hand shuttle.

As shown in FIG. 13, the spindle in its downward movement will engage a limit switch LS3 which through the control circuit causes a power chuck solenoid valve PCSV to be actuated to connect the power chuck 80 of the spindle to a source of air under pressure. Actuation of the power chuck 80 will cause the tool adaptor A held by the right-hand shuttle to be clamped in the spindle. Through sequence valve means SV1 or the like also connected to the air supply, air under pressure is conveyed via a control valve GV to the actuating pistons 210, 212 for the lower set of gripping elements 154-1 of the shuttle, thereby opening these elements allowing the spindle and tool to move down for the work cycle. A limit switch LS4 also actuated by the spindle upon its downward movement will deenergize the solenoid GS, thereby deactuating the control valve GV and allowing the gripping elements to return to closed position.

After the work cycle is completed, the spindle 16 will move upwards upon actuation of the drive for elevating the spindle, and if a tool change is called for by the control system, the flange 73 on the adaptor A of the tool held in the spindle will be snapped through the bottom set of gripping elements 154-1 against the upper set of such elements 154-2. In this position one of the limit switches LS3 associated with the spindle will be tripped, actuating the power chuck solenoid valve thereby releasing the power chuck. The spindle will continue upward to trip the upper limit switch LS1. With a tool change called for, the hydraulic connections to the right-hand cylinder 140R will be reversed so as to move the piston therein in the reverse direction and return the right-hand shuttle toward its matrix. This is achieved by deenergizing the cylinder speed control solenoid CSCS for the right-hand shuttle. At the same time, the cylinder speed control solenoid CSCSL for the left-hand shuttle will be energized to connect pressure fluid to the cylinder 140L so as to move the left-hand shuttle toward the spindle. With a tool change called for, thus, the associated cylinder speed control solenoids CSCS and CSCSL will be deenergized and energized respectively to move the right-hand shuttle and the left-hand shuttle substantially simultaneously relative to the spindle and associated matrixes. The left-hand shuttle will proceed through a sequence to pick up a tool at the tool transfer station. This presupposes that with a tool change called for, the control circuit will have caused the left-hand matrix to move the selected tool to approximately the tool transfer station, whereupon the left-hand matrix will be finally aligned by the shuttle in the course of its movement toward the spindle.

The right-hand shuttle will return the old tool from the spindle to the right-hand matrix, placing it in the tool support at the tool transfer station.

The left-hand shuttle will position the new tool under the spindle 16, and the limit switch LS5 associated with the left-hand shuttle will be tripped to cause the spindle to start its cycle of motion.

If machining is complete and no tool change is called for when the upper limit switch LS1 is actuated upon elevation of the spindle, the control circuit will cause the cycle of operation to terminate. With both cylinder control solenoids deenergized, the shuttle will retract depositing the last tool in the matrix. When no tool change is required such as when drilling repetitive holes of the same size the spindle does not elevate to its tool changing level, suitable limit switch means or the like being provided for control purposes.

While in the foregoing description a specific sequence has been described, a sequence similar to the sequence shown in FIG. 12, it will be readily understood that the present invention contemplates other particular sequences may be followed and it is possible to program the machine tool to select two or more tools successively from the same matrix rather than alternately from the separate matrixes, and to provide other variations as may be desired.

I claim as my invention:

1. For use in apparatus for tool changing, a tool transfer shuttle comprising laterally spaced vertical side walls, sets of longitudinally aligned rollers carried by upper portions of said side walls and adapted to movably support said shuttle for longitudinal movement along a track with said side walls suspended below said track; parallel, resilient tool support arms carried by lower portions of said side walls and projecting forwardly therefrom to embrace a tool therebetween and thereby hold such tool in a vertical position, each said arm including an upper and a lower element cooperating to hold such tool therebetween; and power means carried by said shuttle and acting on the lower set of such elements to spread the latter from a normal fixed spacing to reelase a tool held between said arms.

2. In a machine tool having a vertically movable spindle, a pair of horizontal tool storage matrixes straddling the axis of said spindle and rotatable about vertical axes substantially equally spaced from said spindle, and a tool transfer shuttle for each of said matrixes movable bodily along a horizontal linear path between a terminal point adjacent the respective matrix and a terminal point substantially aligned with said spindle, each said shuttle having means for holding a tool in a vertical position to insert into or withdraw a tool from the respective matrix as an incident to movement of the shuttle and to position a tool in axial alignment with the spindle or to withdraw a tool from such position, said spindle being movable vertically to engage a tool held in axial alignment therewith by one of said shuttles, and means for controlling said shuttles, matrixes and spindle in a tool change cycle for replacing an old tool from the spindle in one matrix by one shuttle and for transferring a new tool from the alternate matrix to said spindle by the other shuttle.

3. In a machine tool having a vertically movable spindle, a pair of horizontal tool storage matrixes straddling the axis of said spindle and rotatable about vertical axes substantially equally spaced from said spindle, and a tool transfer shuttle for each of said matrixes movable along a horizontal linear path above the respective matrix and substantially aligned with said spindle, each said shuttle comprising laterally spaced vertical side walls, means carried by upper portions of said side walls and adapted to movably support said shuttle, and tool support arms carried by lower portions of said side walls and projecting forwardly to embrace a tool therebetween and thereby hold such tool in a vertical position to insert into or withdraw a tool from the respective matrix as an incident to movement of the shuttle and to position a tool in axial alignment with the spindle or to withdraw a tool from such position, said spindle being movable vertically to engage a tool held in axial alignment therewith by one of said shuttles.

4. In a machine tool, a horizontal tool storage matrix rotatably mounted about a vertical axis, a tool transfer shuttle movable horizontally relative to said matrix and having means for carrying a tool into and from said matrix, and means on said shuttle engageable with means on said matrix for rotating said matrix into tool transfer position as an incident to relative movement of said shuttle.

5. In a machine tool, a ring of tool supports each adapted to releasably support a tool and forming a horizontal annular tool storage matrix rotatably mounted about its axis, a tool transfer shuttle movable horizontally in a radial path relative to said matrix and having means for carrying a tool into and from a tool support of said matrix, and means on said shuttle engageable with means on said matrix for rotating said matrix into tool transfer position as an incident to relative movement of said shuttle.

6. In a machine tool having a rotatable spindle, a pair of matrixes straddling said spindle each matrix supporting a plurality of tools for movement of each of said tools to a shuttle station opposite said spindle, means including a pair of shuttles for carrying tools between said spindle and said shuttle stations respectively, and means controlling said shuttles, matrixes and spindle in a tool change cycle for replacing an old tool from the spindle in one matrix by one shuttle and for transferring a new tool from the alternate matrix to said spindle by the other shuttle.

7. In a machine tool having a rotatable spindle, a pair of matrixes straddling said spindle each matrix supporting a plurality of tools for movement of each of said tools to a shuttle station opposite said spindle, means including a pair of shuttles for carrying tools between said spindle and said shuttle stations respectively, and means controlling said shuttles, matrixes and spindle in a tool change cycle for replacing a tool from the spindle in one matrix and for transferring a new tool from the alternate matrix to said spindle, said alternate matrix being movable to locate said new tool at the shuttle station thereof ready for transfer to said spindle prior to said tool change cycle.

8. In a machine tool having a rotatable spindle, a pair of matrixes straddling said spindle each matrix supporting a plurality of tools for movement of each of said tools to a shuttle station opposite said spindle, means including a pair of shuttles for carrying tools between said spindle and said shuttle stations respectively, and means controlling said shuttles, matrixes and spindle in a tool change cycle for replacing an old tool from the spindle in one matrix and for transferring a new tool from the alternate matrix to said spindle, said alternate matrix being movable to locate said new tool at the shuttle station thereof ready for transfer to said spindle prior to said tool change cycle, said controlling means being adapted in said tool change cycle for
   (a) operating one shuttle to carry said old tool to said one matrix, and for
   (b) operating the other shuttle to carry said new tool from the alternate matrix to said spindle.

9. In a machine tool having an axially translatable and rotatable spindle, a pair of matrixes straddling said spindle each matrix supporting a plurality of tools for movement of each of said tools to a shuttle station opposite said spindle, means including a pair of shuttles movable radially of said spindle for transferring succeeding tools to said spindle from alternate matrixes, said shuttles being movable simultaneously in opposite directions for one shuttle to remove a tool from the spindle while the other shuttle transfers a new tool to the spindle, and moves providing relative movement between said spindle and said shuttles respectively in a direction axially of said spindle for transferring tools therebetween.

10. For use in apparatus for changing tools in a machine tool, each of said tools having a thin gripping flange, a tool transfer shuttle having parallel, resilient, horizontal tool gripping arms adapted to embrace a tool for holding such tool in a vertical position by gripping the flange thereof, said arms forming opposed recesses each having a lower shoulder on which said tool flange is adapted to rest, said arms forming outwardly flaring surfaces below said shoulders for spreading a lower portion of said arms upon engagement by the flange of a tool forced upwardly between said arms until said flange is received in said recesses.

11. For use in apparatus for changing tools in a machine tool, each of said tools having a thin gripping flange, a tool transfer shuttle having parallel, resilient, horizontal tool gripping arms adapted to embrace a tool for holding such tool in a vertical position by gripping the flange thereof, said arms forming opposed recesses each having a lower shoulder on which said tool flange is adapted to rest, and means on said arms engageable by the flange of a tool forced upwardly between said arms for spreading a lower portion of said arms until said flange is received in said recesses.

12. In a machine tool having a vertically movable spindle, a pair of horizontal tool storage matrixes straddling the axis of said spindle each defining a ring of tool support sockets rotatable about vertical axes substantially equally spaced from said spindle, a tool transfer shuttle for each of said matrixes movable along a horizontal linear path connecting a point inside the respective matrix ring and a point substantially aligned with said spindle, each said shuttle having means for holding a tool in a vertical position to insert into or withdraw a tool from the respective matrix as an incident to movement of the shuttle and to position a tool in axial alignment with the spindle or to withdraw a tool from such position, said spindle being movable vertically to engage a tool held in axial alignment therewith by one of said shuttles, and means for controlling said shuttles, matrixes and spindle in a tool change cycle for replacing an old tool from the spindle in one matrix by one shuttle and for transferring a new tool from the alternate matrix to said spindle by the other shuttle.

13. In a machine tool having an automatic tool changer; the combination comprising a vertical, axially movable, rotatable spindle; a tool storage matrix defining a plurality of supports horizontally spaced from said spindle for carrying tools in vertical storage position; a tool transfer shuttle mounted to move bodily in a horizontal linear path extending from a first terminal point adjacent said matrix to a second terminal point between said matrix and said spindle for carrying a tool along a horizontal linear path between said matrix and said spindle; a fixed horizontal track extending laterally from said spindle to said matrix for carrying said shuttle along said path; and holding means on said shuttle for selectively gripping or releasing a tool in the matrix tool support or in said spindle and for holding a tool in vertical position while said shuttle moves along said path between said terminal points, said shuttle and said holding means serving as said shuttle moves toward said first terminal point to hold a tool in horizontal alignment with its storage position and to transfer such tool directly to a matrix tool support as an incident to shuttle movement, and serving as said shuttle moves to said second terminal point to withdraw a tool from said matrix tool support and to transport the tool to a position in vertical alignment with said spindle, said spindle being movable vertically downward into engagement with a tool held in said shuttle so as to transfer the tool directly to said spindle as an incident to spindle movement past said shuttle.

14. In a machine tool having an automatic tool changer; the combination comprising, a vertical, axially movable, rotatable spindle; a tool storage matrix defining a plurality of supports horizontally spaced from said spindle for carrying tools in vertical storage position; a tool transfer shuttle mounted to move bodily in a horizontal linear path extending from a first terminal point laterally spaced from said spindle beyond one of said matrix tool supports to a second terminal point between said matrix and said spindle; a fixed horizontal track extending laterally from said spindle to said matrix for carrying said shuttle along said path, said shuttle being mounted on said track with one end facing said spindle; means on said one end of said shuttle for selectively gripping or releasing a tool in said spindle and for holding a tool in vertical position while said shuttle moves along said path between said terminal points, said shuttle and said holding means serving as said shuttle moves past a matrix tool support toward said first terminal point to hold a tool in trailing relation to said shuttle and in horizontal alignment with its storage position and to transfer such tool directly to the matrix tool support as an incident to shuttle movement, and serving as said shuttle moves to said second terminal point to selectively grip and withdraw a tool from said matrix tool support and to transport the tool in leading relation to said shuttle to a position in vertical alignment with said spindle; means responsive to said shuttle reaching said second terminal point for moving said spindle vertically downward into engagement with a tool held in said shuttle; and means responsive to such movement of said spindle for releasing said holding means so as to transfer the tool directly to said spindle as an incident to spindle movement past said shuttle.

References Cited by the Examiner
UNITED STATES PATENTS 2,955,488   10/60   Philip.

RICHARD H. EANES, Jr., *Primary Examiner.*

WHITMORE A. WILTZ, *Examiner.*